(12) United States Patent
Bay

(10) Patent No.: US 8,008,790 B2
(45) Date of Patent: Aug. 30, 2011

(54) SYSTEM FOR RECOVERING OR CONVERTING ENERGY FOR EQUIPMENT HAVING A MOVABLE IMPLEMENT AND METHOD

(75) Inventor: Tod A. Bay, Adamstown, PA (US)

(73) Assignee: CNH America LLC, New Holland, PA (US)

( * ) Notice: Subject to any disclaimer, the term of this patent is extended or adjusted under 35 U.S.C. 154(b) by 334 days.

(21) Appl. No.: 12/339,750

(22) Filed: Dec. 19, 2008

(65) Prior Publication Data
US 2010/0156115 A1  Jun. 24, 2010

(51) Int. Cl.
H02K 7/18 (2006.01)

(52) U.S. Cl. .................................... 290/1 R
(58) Field of Classification Search ............... 290/1 R, 290/50, 44; 903/909
See application file for complete search history.

(56) References Cited

U.S. PATENT DOCUMENTS

| | | | |
|---|---|---|---|
| 1,557,570 A | 10/1925 | Eckman et al. | |
| 4,032,829 A | 6/1977 | Schenavar | |
| 4,076,060 A * | 2/1978 | Bestard | 144/4.1 |
| 4,597,463 A | 7/1986 | Barnard | |
| 4,684,854 A | 8/1987 | Sankey | |
| 4,931,662 A | 6/1990 | Burton | |
| 5,712,456 A | 1/1998 | McCarthy et al. | |
| 6,204,568 B1 | 3/2001 | Runner | |
| 7,165,654 B2 | 1/2007 | Takehara et al. | |
| 7,261,170 B2 | 8/2007 | Leifert | |
| 7,541,684 B1 * | 6/2009 | Valentino | 290/1 R |
| 2006/0232074 A1 * | 10/2006 | Chiasson | 290/53 |
| 2008/0048497 A1 | 2/2008 | Donnelly et al. | |
| 2008/0121448 A1 | 5/2008 | Betz et al. | |
| 2010/0332061 A1 * | 12/2010 | Forslow et al. | 701/22 |

FOREIGN PATENT DOCUMENTS

JP  58218430 A  12/1983

* cited by examiner

Primary Examiner — Michael C Zarroli
(74) Attorney, Agent, or Firm — Patrick M. Sheldrake; Michael G. Harms

(57) ABSTRACT

Potential energy of an implement and implement supporting member, such as a mechanical arm, attached to a machine, such as construction equipment, is recovered by an energy converter, such as a generator or a motor driven by a flywheel or a pull-cord generator, during relative movement between the implement supporting member and the machine. An activator causes relative movement between the implement and the machine. The flywheel or pull-cord generator drives an auxiliary pump or electric generator when the flywheel or pull-cord generator moves relative the auxiliary pump or electric generator. The recovered potential energy is stored in an accumulator or battery. Kinetic energy may be converted to electric energy or hydraulic pressure and stored for later use.

16 Claims, 3 Drawing Sheets

SYSTEM FOR RECOVERING OR CONVERTING ENERGY FOR EQUIPMENT HAVING A MOVABLE IMPLEMENT AND METHOD

FIELD OF THE INVENTION

The present invention relates generally to a machine, such as construction equipment or agricultural equipment, having an implement mounted on an implement supporting member, such as a mechanical arm, that is movable by an hydraulic actuator, and more particularly to a system for such machines to recover and store potential energy associated with lowering of the raised implement, or converting kinetic energy as the implement is moved.

BACKGROUND OF THE INVENTION

The primary work of construction equipment is produced through movement of mechanical arms or linkages often powered by actuators, such as linear hydraulic cylinders activated and rotary actuators by a pressurized hydraulic fluid. These arms or linkages move in either with or against the force of gravity, i.e., the arms or linkages are raised and lowered. When the arms or linkages are moving with the force of gravity, it would be advantageous to store lost potential energy for use at times of increased power requirements, such as when the arms or linkages are being raised.

Further, as the implement is being moved relative to the machine or relative one or more mechanical arms mounting the implement to the machine, it may be advantageous to convert the kinetic energy to a form that can be used at a later time. For example, energy from the pressurized hydraulic fluid source could be converted into electrical energy and stored in a battery for later use when the demands on the hydraulic fluid system is great.

SUMMARY OF THE INVENTION

In one embodiment, a system for recovering or converting energy associated with a machine having an implement mounted on the machine by an implement supporting member, in which the implement supporting member is movable relative the machine, includes an energy converter, an energy converter activation device and a flywheel. The energy converter is mounted on one of the implement supporting member or machine. The energy converter activation device is interposed between energy converter and the other of the machine or implement supporting member. The flywheel is mounted on the same implement supporting member or machine as the energy converter. The flywheel is interposed between the energy converter activation device and the energy converter. The energy converter actuation device drives the flywheel, which in turn drives the energy converter as the energy converter activation device moves relative to the flywheel.

Another embodiment of the invention is a system for recovering or converting energy associated with a machine having an implement mounted on the machine by a first mechanical arm and a second mechanical arm, in which the second mechanical arm interposed between the first mechanical arm and the machine. The first mechanical arm is movable relative the second mechanical arm about a pivot point by a linear actuator. One end of the linear actuator is secured to the first mechanical arm member on one side of the pivot point and the opposite end of the linear actuator is secured to the second mechanical arm member on the other side of the pivot point. An energy converter is mounted on one of the first and second mechanical arms on one side of the pivot point and the energy converter activation device is mounted on the other of the first and second mechanical arms on the other side of the pivot point. A flywheel is mounted on the same mechanical arm as the energy converter. The flywheel is interposed between the energy converter activation device and the energy converter. The energy converter actuation device drives the flywheel as the linear actuator extends or retracts and the first mechanical arm moves relative to the second mechanical arm and the flywheel drives the energy converter.

An additional embodiment of the invention is a method of recovering or converting energy associated with a machine having an implement mounted on the machine by an implement supporting member, in which the implement supporting member is movable relative the machine by an hydraulic actuator. The machine includes an energy converter is mounted on one of the implement supporting member or machine, an energy converter activation device interposed between the energy converter and the other of the machine or the implement supporting member, and a flywheel mounted on the same implement supporting member or machine as the energy converter. The flywheel is interposed between the energy converter activation device and the energy converter. The flywheel is driven by energy converter activation device as the energy converter activation device moves relative to the flywheel and the energy converter is driven by the flywheel.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The advantages of this invention will be apparent upon consideration of the following detailed disclosure of the invention, especially when taken in conjunction with the accompanying drawings wherein like reference numerals refer to like elements and wherein.

DETAILED DESCRIPTION OF THE INVENTION

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

While the system will be described with relation to the backhoe loader 1 shown in the FIG. 1 and telehandler 31 shown in FIG. 4, it can be used in any number of types of mobile and immobile equipment during the movement of the implement mounted on the equipment. The various types of equipment include backhoes, excavators, skid steer loaders, front end loaders, cranes, dump trucks, dozers, graders, agricultural tractor 3-point hitches, lift trucks, pile drivers and garbage trucks having implements which include backhoes, skids, buckets, hooks, dump bodies, blades, hydraulic hammers, grapples and augers.

Figure 1:
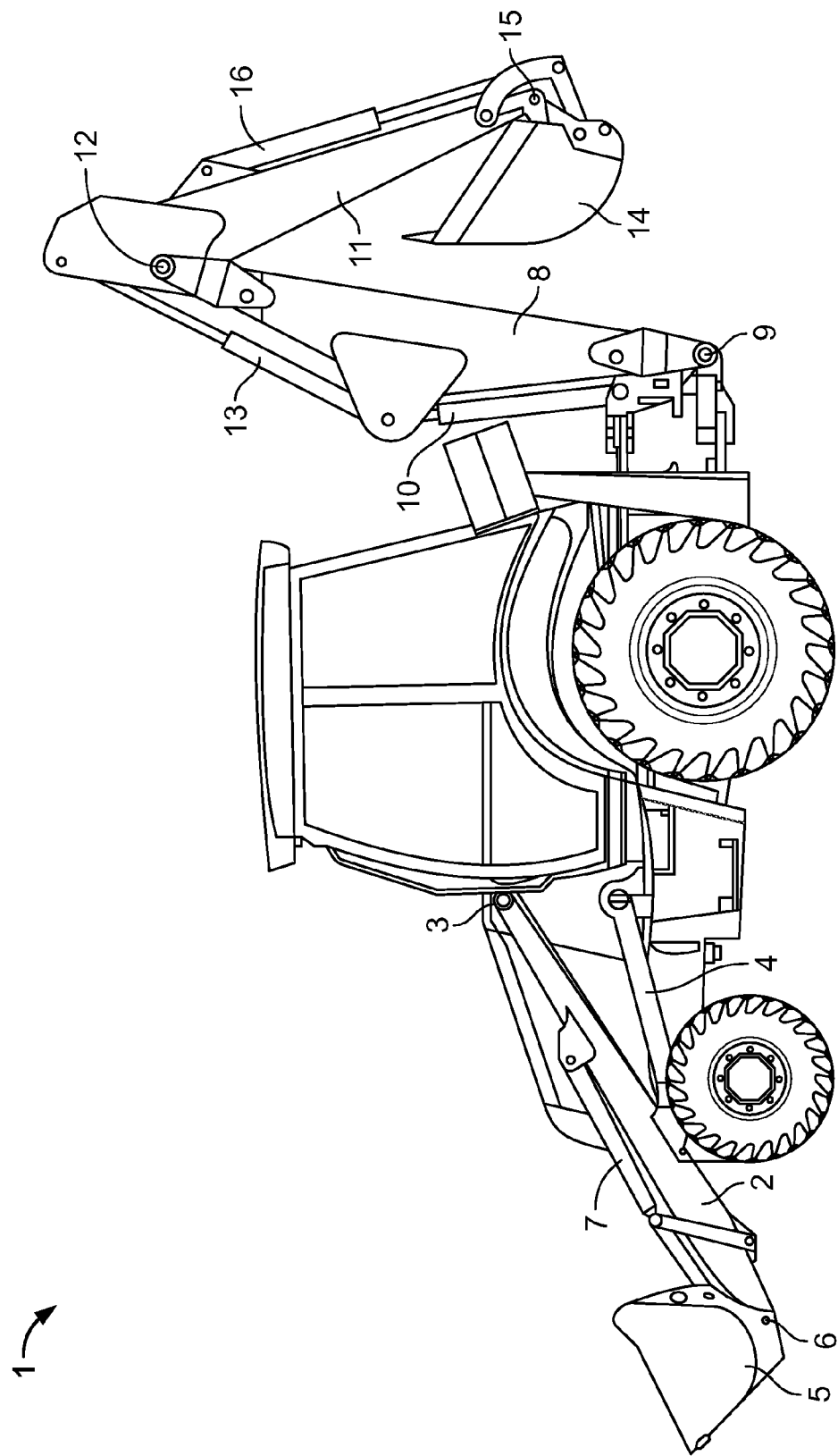
FIG. 1 is a side view of a backhoe loader having a mechanical arm and backhoe attached to the rear end thereof.

The backhoe loader 1 shown in FIG. 1 includes a number of mechanical arms and hydraulic actuators or cylinders. Loader arm 2 is secured to the main frame of the backhoe loader 1 and rotates about the loader arm pivot point 3. One end of loader lift cylinder 4 is secured to the backhoe loader 1 on one side of the loader arm pivot point 3 and the opposite end of the loader lift cylinder 4 is secured to the loader arm 2 on the other side of the loader arm pivot point 3.

Loader bucket 5 is secured to the loader arm 2 and rotates about loader bucket pivot point 6. One end of loader bucket cylinder 7 is secured to the loader arm 2 on one side of the loader bucket pivot point 6 and the opposite end of the loader bucket cylinder 7 is secured to the loader bucket 5 on the other side of the loader bucket pivot point 6.

A mechanical arm, such as a boom 8 is secured to the main frame of the backhoe loader 1 and rotates about the boom pivot point 9. One end of boom cylinder 10 is secured to the backhoe loader 1 on one side of the boom pivot point 9 and the opposite end of the boom cylinder 10 is secured to the boom 8 on the other side of the boom pivot point 9.

Another mechanical arm, such as a dipper 11 is secured to the boom 8 and rotates about the dipper pivot point 12. One end of dipper cylinder 13 is secured to the boom 8 on one side of the dipper pivot point 12 and the opposite end of the dipper cylinder 13 is secured to the dipper 11 on the other side of the dipper pivot point 12.

An implement such as a dipper bucket 14 is secured to the dipper 11 and rotates about the dipper bucket pivot point 15. One end of dipper bucket cylinder 16 is secured to the dipper 11 on one side of the dipper bucket pivot point 15 and the opposite end of the dipper bucket cylinder 16 is secured to the dipper bucket 14 on the other side of the dipper bucket pivot point 15.

The rotational movement of each the mechanical arms can be used to recover potential energy as the distal end of the mechanical arms is lowered or to convert the kinetic energy of the rotation of the mechanical arms into electrical energy to be stored in a battery or into hydraulic pressure to be stored in an accumulator. A single system can be used to recover or convert energy as one mechanical arm rotates about a single pivot point or a plurality of systems can be used to recover or convert energy as one or more mechanical arms rotate about a plurality of pivot points.

Figure 2:
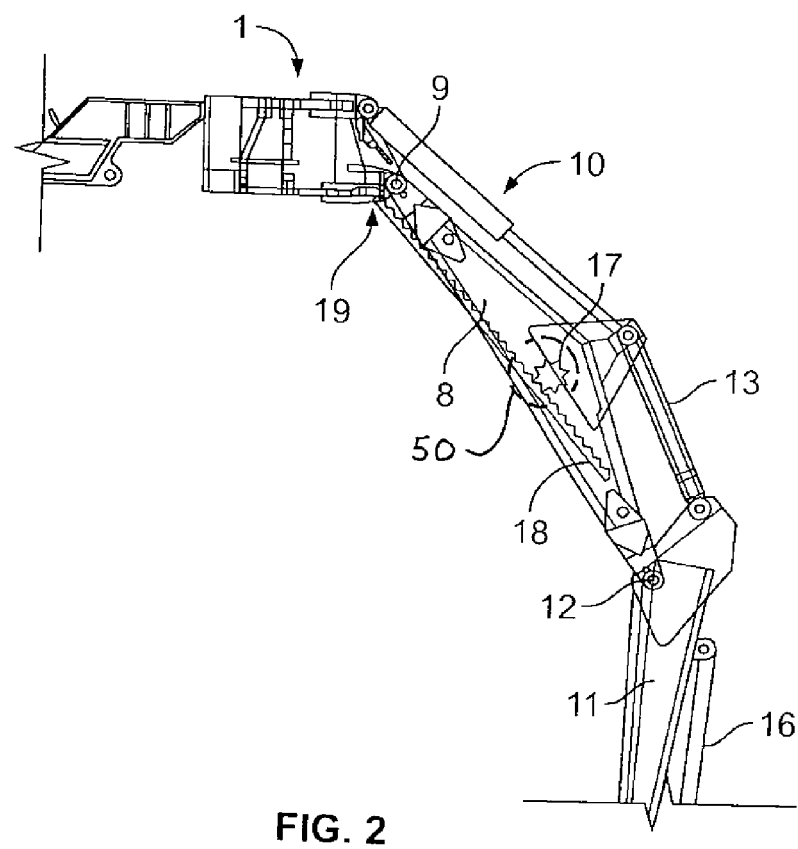
FIG. 2 is a fragmentary schematic side view of the backhoe loader and mechanical arm of FIG. 1 with a flywheel mounted on a boom, one face of the boom being broken away to show the flywheel and a toothed rack.

In one embodiment shown in FIG. 2, a system transfers the potential energy and converts the kinetic energy of boom 8, dipper 11 and dipper bucket 14 (not shown) as the boom 8 rotates about boom pivot point 9. A flywheel 17 is mounted on boom 8 and powers an energy converter 50, such as a hydraulic pump or electrical generator. Potential energy and kinetic energy is captured during the downward motion of the boom 8.

The mechanical flywheel 17 is mounted on the distal end of the boom cylinder 10 so that its direction of rotation is coincident with the linear motion of the boom 8. In some embodiments, the flywheel is enclosed within the welded structure of the boom 8 to prevent interference with external components or with the ground as the implement engages the soil.

The flywheel 17 is connected to a one-way drive sprag clutch so that the flywheel 17 is driven by a force as the boom 8 moves in one direction but is allowed to free wheel as the boom 8 moves in the other direction. A pinion that engages a toothed rack 18 is mounted to the sprag clutch. The cogged or toothed rack 18, also referred to as an activation device, is secured to the backhoe loader 1 at 19 so that it is fixed relative to the backhoe loader 1. In one embodiment, the toothed rack 18 is a straight flexible strap with the end opposite the fixed end being free. The toothed rack 18 is stiff enough to remain engaged with the pinion, but flexible to enough to rotate in the same direction of motion as the boom 8 when the boom 8 is raised and lowered. The straight flexible strap may be made from a plastic, such as nylon.

The relative motion between the backhoe loader 1 and boom 8 is used to drive the flywheel 17. As the boom cylinder 10 is extended, the boom 8 lowers due to the effect of gravity, as well as the effect of the boom cylinder 10. As the boom 8 lowers, the pinion of the sprag clutch moves along the activation device toothed rack 18 away from the backhoe loader 1, causing the sprag clutch and flywheel 17 to rotate in the driven direction. Potential energy stored in the boom 8, dipper 11, dipper bucket 14 and anything in the dipper bucket 14, as well as kinetic energy generated by the movement of the boom cylinder 10, is transferred to the flywheel 17 as the boom is lowered.

As the boom cylinder 10 is retracted, the boom 8 raises and the clutch disengages allowing the pinion to move back along the toothed rack 18 without the pinion engaging the flywheel 17. This process continues with the cyclic operation of the boom 8 to keep the flywheel 17 rotating.

The flywheel 17 can be used to drive an energy converter 50, such as an auxiliary hydraulic pump or electric generator. If the flywheel 17 drives an auxiliary hydraulic pump, the recovered potential energy is stored in an accumulator (not shown). If the flywheel 17 drives an electric generator, the recovered potential energy is stored in a battery (not shown).

In some embodiments the cogged or toothed rack 18 is a looped cogged belt. Such a looped cogged belt may be made of rubber and is fixed to the machine.

To convert the kinetic energy of the boom 8 as it is raised about the boom pivot point 9, another flywheel and toothed rack can be mounted on the backhoe loader 1 and boom 8, so that the flywheel is driven as the boom cylinder 10 is retracted and the fly wheel free wheels as the boom cylinder 10 is extended. Alternatively, gearing can be arranged to drive the flywheel 17 as the boom cylinder 10 is retracted and to allow the flywheel 17 to free wheel as the boom cylinder 10 is extended.

In another embodiment, the positions of the flywheel 17 and toothed rack 18 can be reversed. The flywheel 17 can be mounted on the backhoe loader 1 and the toothed rack 18 can be secured to the boom cylinder 10.

In a similar manner, the rotational movements of the loader arm 2 about the loader arm pivot point 3, the loader bucket 5 about the loader bucket pivot point 6, the dipper 11 about the dipper pivot point 12, and the dipper bucket 14 about the dipper bucket pivot point 15 can be used to recover potential energy and convert kinetic energy.

Figure 3:
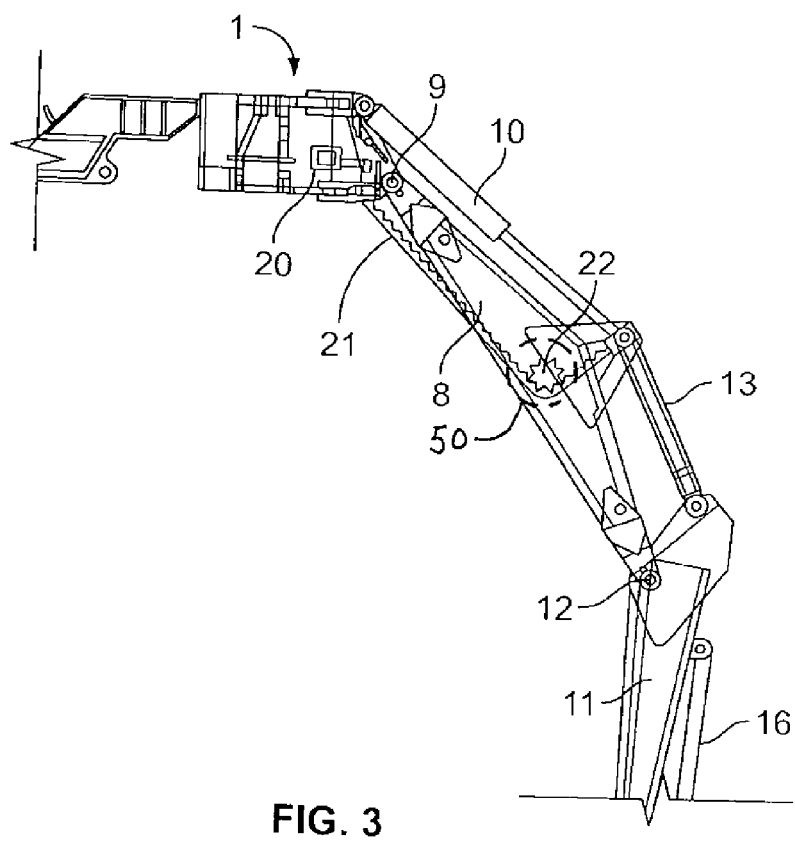
FIG. 3 is a fragmentary schematic side view of the backhoe loader and mechanical arm of FIG. 1 with a pull-cord generator mounted on the backhoe loader, one face of a boom being broken away to show a spring tensioned pull string and pulley system.

In another embodiment shown in FIG. 3, a system transfers the potential energy of boom 8 into a pull-cord generator 20. The pull-cord generator 20 is mounted on the backhoe loader 1. The potential energy is captured during the downward motion of the boom 8.

Such pull-cord generators are commercially available and use a spring tensioned pull string, rope or cable 21 to activate the pull-cord generator 20. As the cable 21 is pulled outwardly from the pull-cord generator 20, the electrical generation mechanism within the pull-cord generator 20 is activated. The cable 21 is spring-loaded to pull the cable 21 back into the pull-cord generator 20.

The free end of the cable 21 may be attached directly to the distal end of the boom cylinder 10 or attached through a pulley system 22 to compensate for geometry and mechanical advantage. As the distal end of the boom cylinder 10 extends, the boom 8 lowers due to the effect of gravity, as well as the effect of the boom cylinder 10. As the boom 8 moves downward, the cable 21 is pulled outward from the pull-cord generator 20, transferring the potential energy stored in the boom 8, dipper 11, dipper bucket 14 and anything in the dipper bucket 14, as well as kinetic energy generated by the movement of the boom cylinder 10, to the electrical generation mechanism within the pull-cord generator 20.

As the boom cylinder 10 retracts, the boom 8 is moves upward and the cable 21 is retracted into the pull-cord generator 20. The electrical energy that is generated by the pull-cord generator 20 may be stored in a battery (not shown). This process is repeated with the cyclic operation of the boom 8.

As with the previous embodiment, the positions of the pull-cord generator 20 and attachment of the cable 21 can be reversed. The pull-cord generator can be mounted on the member of the mechanical arm to which the distal end of the boom cylinder 10 is attached and the cable 21 can be secured to the backhoe loader 1 near the boom pivot point 9. Again, as the boom 8 moves downward, the distal end of the boom cylinder 10 extends and the cable 21 is pulled outward from the pull-cord generator 20, which activates the electrical generation mechanism within the pull-cord generator 20.

Also similarly to the previous embodiment, movement of the various mechanical arms and associated cylinders may be used to drive a pull-cord generator. In each case, the pull-cord generator is mounted on the mechanical arm member to which the proximal end of the associated cylinder is mounted or the mechanical arm member to which the distal end of the associated cylinder is secured and the cable is secured to the other mechanical arm member.

Figure 4:
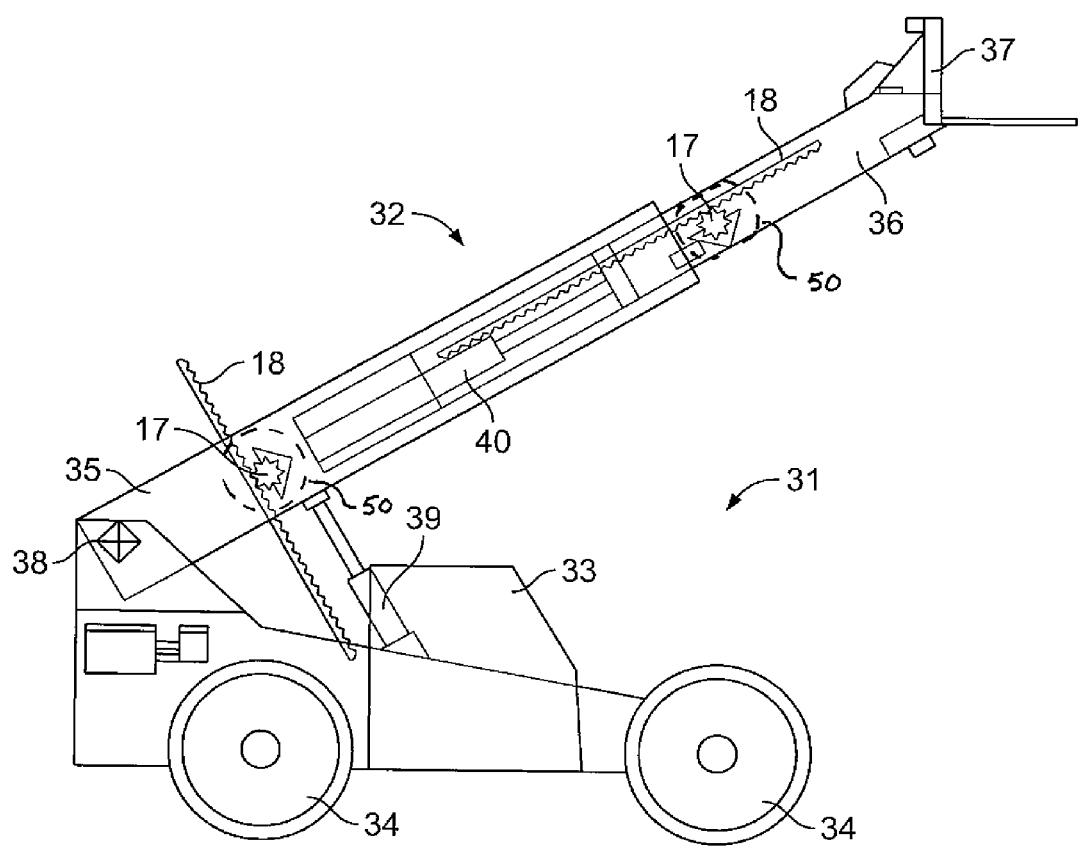
FIG. 4 is a side view of a telehandler or telescoping handler having a telescoping boom, one face of the telescoping boom being broken away to an upper boom cylinder.

The telehandler 31 shown in FIG. 4 includes a telescoping boom 32 and cab 33 supported on a main frame and wheels 34. The boom 32 has a lower boom section 35 and an upper boom section 36. An implement, such as a fork lift 37 is attached to upper boom section 36. The boom 32 is raised and lowered about pivot point 38 by the lower boom cylinder 39. The upper boom section 36 is extended and retracted by the upper boom cylinder 40.

In a manner similar to the backhoe loader embodiment, the flywheel 17 is mounted on the lower boom section 35 and powers a hydraulic pump or electrical generator (not shown). Potential energy and kinetic energy is captured during the downward motion of the boom 32.

The mechanical flywheel 17 is mounted on the lower boom section 35 adjacent one end of the lower boom cylinder 39. The flywheel 17 is connected to a one-way drive sprag clutch so that the flywheel 17 is driven by a force as the boom 32 is lowered about pivot point 38, but is allowed to free wheel as the boom 32 is raised. A pinion that engages a toothed rack 18 is mounted to the sprag clutch. The cogged or toothed rack 18 is secured to the telehandler 31 adjacent the other end of the lower boom cylinder 39 and is fixed relative to the telehandler 31.

The relative motion between the telehandler 31 and boom 32 is used to drive the flywheel 17. As the lower boom cylinder 39 is retracted, the boom 32 lowers due to the effect of gravity, as well as the effect of the lower boom cylinder 39. As the boom 32 lowers, the pinion of the sprag clutch moves along the toothed rack 18 toward the telehandler 31, causing the sprag clutch and flywheel 17 to rotate in the driven direction. Potential energy stored in the boom 32, forklift 37, and anything on the forklift 37, as well as kinetic energy generated by the movement of the lower boom cylinder 39, is transferred to the flywheel 17 as the boom 32 is lowered.

As the lower boom cylinder 39 is extended, the boom 32 raises and the clutch disengages allowing the pinion to move back along the toothed rack 18 without the pinion engaging the flywheel 17. This process continues with the cyclic operation of the boom 32 to keep the flywheel 17 rotating.

The flywheel 17 can be used to drive an auxiliary hydraulic pump or electric generator (not shown). If the flywheel 17 drives an auxiliary hydraulic pump, the recovered potential energy is stored in an accumulator (not shown). If the flywheel 17 drives an electric generator, the recovered potential energy is stored in a battery (not shown).

Another flywheel 17 is mounted on the upper boom section 36 and powers a hydraulic pump or electrical generator (not shown). Potential energy and kinetic energy is captured as the upper boom section 36 is retracted.

The mechanical flywheel 17 is mounted on the upper boom section 36 adjacent one end of the upper boom cylinder 40. The flywheel 17 is connected to a one-way drive sprag clutch so that the flywheel 17 is driven by a force as the upper boom section 36 is retracted, but is allowed to free wheel as the upper boom section 36 is extended. A pinion that engages a toothed rack 18 is mounted to the sprag clutch. The cogged or toothed rack 18 is secured to the lower boom section 35 adjacent the other end of the upper boom cylinder 40 and is fixed relative to the lower boom section 35.

The relative motion between the lower boom section 35 and the upper boom section 36 is used to drive the flywheel 17. As the upper boom cylinder 40 is retracted, the upper boom section 36 retracts due to the effect of gravity, as well as the effect of the upper boom cylinder 40. As the upper boom section 36 retracts, the pinion of the sprag clutch moves along the toothed rack 18 toward the lower boom section 35, causing the sprag clutch and flywheel 17 to rotate in the driven direction. Potential energy stored in the upper boom section 36, forklift 37, and anything on the forklift 37, as well as kinetic energy generated by the movement of the upper boom cylinder 40, is transferred to the flywheel 17 as the upper boom section 36 is retracted.

As the upper boom cylinder 40 is extended, the upper boom section 36 extends and the clutch disengages allowing the pinion to move back along the toothed rack 18 without the pinion engaging the flywheel 17. This process continues with the cyclic operation of the upper boom section 36 to keep the flywheel 17 rotating.

The flywheel 17 can be used to drive an auxiliary hydraulic pump or electric generator (not shown). If the flywheel 17 drives an auxiliary hydraulic pump, the recovered potential energy is stored in an accumulator (not shown). If the flywheel 17 drives an electric generator, the recovered potential energy is stored in a battery (not shown).

It should be understood that the application is not limited to the details or methodology set forth in the following description or illustrated in the figure. It should also be understood that the phraseology and terminology employed herein is for the purpose of description only and should not be regarded as limiting.

While the exemplary embodiments illustrated in the figure and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The invention claimed is:

1. A system for recovering or converting energy associated with a machine having an implement mounted on the machine by an implement supporting member, wherein the implement supporting member is movable relative the machine by an hydraulic actuator, the system comprising:
   an energy converter mounted on one of the implement supporting member or the machine;
   an energy converter activation device interposed between the energy converter and the other of the machine and the implement supporting member; and
   a flywheel mounted on the same implement supporting member or machine as the energy converter, the flywheel being interposed between the energy converter activation device and the energy converter;
   wherein relative movement between the energy converter activation device and the flywheel drives the flywheel, which in turn drives the energy converter;
   wherein the energy converter is selected from the group consisting of a hydraulic pump and an electric generator and the energy converter is a hydraulic pump and the energy converted by the energy converter is stored in an accumulator.

2. The system of claim 1, wherein the energy converter activation device is engagable with the flywheel through a one-way drive sprag clutch;
   wherein the flywheel is driven by the energy converter activation device through the sprag clutch as the implement supporting member is moved in one direction relative the machine and the sprag clutch disengages the energy converter activation device from the flywheel as the implement supporting member is moved in the opposite direction relative the machine so that the flywheel free wheels; and
   wherein the flywheel engages the energy converter to drive the energy converter.

3. A system for recovering or converting energy associated with a machine having an implement mounted on the machine by an implement supporting member, wherein the implement supporting member is movable relative the machine by a hydraulic actuator, the system comprising:
   an energy converter mounted on one of the implement supporting member or the machine;
   an energy converter activation device interposed between the energy converter and the other of the machine and the implement supporting member; and
   a flywheel mounted on the same implement supporting member or machine as the energy converter, the flywheel being interposed between the energy converter activation device and the energy converter;
   wherein relative movement between the energy converter activation device and the flywheel drives the flywheel, which in turn drives the energy converter;
   wherein the energy converter is selected from the group consisting of a hydraulic pump and an electric generator and the energy converter is an electric generator and the energy converted by the energy converter is stored in a battery.

4. A system for recovering or converting energy associated with a machine having an implement mounted on the machine by an implement supporting member, wherein the implement supporting member is movable relative the machine by an hydraulic actuator, the system comprising:
   an energy converter mounted on one of the implement supporting member or the machine;
   an energy converter activation device interposed between the energy converter and the other of the machine and the implement supporting member; and
   a flywheel mounted on the same implement supporting member or machine as the energy converter, the flywheel being interposed between the energy converter activation device and the energy converter;
   wherein relative movement between the energy converter activation device and the flywheel drives the flywheel, which in turn drives the energy converter;
   the implement supporting member is movable relative to the machine about a pivot point and is a first mechanical arm and the hydraulic actuator is a linear actuator;
   wherein the implement is mounted on the machine by the first mechanical arm; and
   wherein the first mechanical arm is movable relative the machine about the pivot point by the linear actuator, wherein one end of the linear actuator is secured to the machine on one side of the pivot point and the opposite end of the linear actuator is secured to the first mechanical arm on the other side of the pivot point.

5. The system of claim 4, wherein the energy converter activation device is a toothed flexible strap having a free end distal the end mounted on the machine or the first mechanical arm.

6. The system of claim 4, wherein the energy converter is a pull-cord generator and the energy converter activation device is a flexible member selected from the group consisting of a string, rope and cable, one end of the flexible member being secured to the pull-cord generator to activate the generator when the flexible member is pulled;
   the other end of the flexible member being secured to the other of the machine or the first mechanical arm on the other side of the pivot point; and
   wherein the flexible member is pulled as the first mechanical arm is moved in one direction relative the machine and the flexible member is retracted into the pull-cord generator as the first mechanical arm is moved in the other direction relative the machine.

7. The system of claim 4, wherein a second mechanical arm is interposed between the first mechanical arm and the implement, wherein the second mechanical arm is movable relative the first mechanical arm about a second pivot point by a second linear actuator, one end of the second linear actuator being secured to the first mechanical arm on one side of the second pivot point and the opposite end of the second linear actuator being secured to the second mechanical arm on the other side of the second pivot point, the system further comprising:
   a second energy converter mounted on one of the first and second mechanical arms on one side of the second pivot point; and
   a second energy converter activation device secured to the other of the first and second mechanical arms on the other side of the second pivot point; and
   wherein the second energy converter activation device drives the second energy converter as the second linear actuator extends or retracts and the first mechanical arm moves relative to the second mechanical arm.

8. A system for recovering or converting energy associated with a machine having an implement mounted on the machine by an implement supporting member, wherein the implement supporting member is movable relative the machine by a hydraulic actuator, the system comprising:

an energy converter mounted on one of the implement supporting member or the machine;

an energy converter activation device interposed between the energy converter and the other of the machine and the implement supporting member; and a flywheel mounted on the same implement supporting member or machine as the energy converter, the flywheel being interposed between the energy converter activation device and the energy converter;

wherein relative movement between the energy converter activation device and the flywheel drives the flywheel, which in turn drives the energy converter;

the implement supporting member is movable relative to the machine about a pivot point;

wherein the implement supporting member is a first mechanical arm and the actuator is a linear actuator;

wherein the machine has a second mechanical arm interposed between the first mechanical arm and the machine, wherein the implement is mounted on the machine by the first mechanical arm and the second mechanical;

wherein the first mechanical arm is movable relative the second mechanical arm about the pivot point by the linear actuator, wherein one end of the linear actuator is secured to the first mechanical arm on one side of the pivot point and the opposite end of the linear actuator is secured to the second mechanical arm on the other side of the pivot point;

wherein the energy converter is mounted on one of the first and second mechanical arms on one side of the pivot point, wherein the energy converter activation device secured to the other of the first and second mechanical arms on the other side of the pivot point; and wherein the energy converter activation device drives the energy converter as the linear actuator extends or retracts and the first mechanical arm moves relative to the second mechanical arm.

9. A system for recovering or converting energy associated with a machine having an implement mounted on the machine by a first mechanical arm and a second mechanical arm interposed between the first mechanical arm and the machine, wherein the first mechanical arm is movable relative the second mechanical arm about a pivot point by a linear actuator, one end of the linear actuator being secured to the first mechanical arm on one side of the pivot point and the opposite end of the linear actuator being secured to the second mechanical arm on the other side of the pivot point, the system comprising:

an energy converter mounted on one of the first and second mechanical arms on one side of the pivot point;

an energy converter activation device secured to the other of the first and second mechanical arms on the other side of the pivot point; and a flywheel mounted on the same mechanical arm as the energy converter, the flywheel being interposed between the energy converter activation device and the energy converter; and wherein the energy converter activation device drives the flywheel as the linear actuator extends or retracts and the first mechanical arm moves relative to the second mechanical arm and wherein the flywheel drives the energy converter.

10. A method of recovering or converting energy associated with a machine having an implement mounted on the machine by an implement supporting member, wherein the implement supporting member moves relative the machine by an hydraulic actuator, wherein the machine comprises:

(a) an energy converter mounted on one of the implement supporting member or the machine;

(b) an energy converter activation device interposed between the energy converter and the other of the machine and the implement supporting member, and (c) a flywheel mounted on the same implement supporting member or machine as the energy converter, the flywheel being interposed between the energy converter activation device and the energy converter, the method comprising:

driving the flywheel by the energy converter activation device as the energy converter moves relative to flywheel and driving the energy converter by the flywheel;

wherein the energy converter activation device engages the flywheel through a one-way drive sprag clutch; and wherein the energy converter activation device drives the flywheel through the sprag clutch as the implement supporting member is moved in one direction and the sprag clutch disengages the energy converter activation device from the flywheel as the implement supporting member is moved in the opposite direction so that the flywheel free wheels, and wherein the flywheel engages the energy converter and drives the energy converter.

11. The method of claim 10, wherein the implement supporting member moves relative to the machine about a pivot point.

12. The method of claim 11, wherein the implement supporting member is a first mechanical arm and the actuator is a linear actuator;

wherein the implement is mounted on the machine by the first mechanical arm, wherein the first mechanical arm moves relative the machine about the pivot point by the linear actuator, wherein one end of the linear actuator is secured to the machine on one side of the pivot point and the opposite end of the linear actuator is secured to the first mechanical arm on the other side of the pivot point.

13. The method of claim 12, wherein the energy converter activation device is a toothed flexible strap having a free end distal the end mounted on the machine or the first mechanical arm.

14. The method of claim 12, wherein the energy converter is a pull-cord generator and the energy converter activation device is a flexible member selected from the group consisting of a string, rope and cable, one end of the flexible member being secured to the pull-cord generator to activate the generator when the flexible member is pulled, the other end of the flexible member being secured to the other of the machine or the first mechanical arm on the other side of the pivot point; and wherein the flexible member is pulled as the first mechanical arm is moved in one direction relative the machine and the flexible member is retracted into the pull-cord generator as the first mechanical arm is moved in the other direction relative the machine.

15. The method of claim 12, wherein a second mechanical arm is interposed between the first mechanical arm and the implement;

wherein the second mechanical arm moves relative the first mechanical arm about a second pivot point by a second linear actuator, one end of the second linear actuator being secured to the first mechanical arm on one side of the second pivot point and the opposite end of the second linear actuator being secured to the second mechanical arm on the other side of the second pivot point;

wherein a second energy converter is mounted on one of the first and second mechanical arms on one side of the second pivot point, wherein a second energy converter activation device is secured to the other of the first and second mechanical arms on the other side of the second pivot point; and wherein the second energy converter activation device drives the second energy converter as the second linear actuator extends or retracts and the first mechanical arm moves relative to the second mechanical arm.

16. The method of claim 12, wherein the implement supporting member is a first mechanical arm, the axis is a pivot point and the actuator is a linear actuator, wherein the implement is mounted on the machine by the first mechanical arm and a second mechanical arm interposed between the first mechanical arm and the machine, wherein the first mechanical arm moves relative the second mechanical arm about the pivot point by the linear actuator;

wherein one end of the linear actuator is secured to the first mechanical arm on one side of the pivot point and the opposite end of the linear actuator is secured to the second mechanical arm on the other side of the pivot point, wherein the energy converter is mounted on one of the first and second mechanical arms on one side of the pivot point; and wherein the energy converter activation device secured to the other of the first and second mechanical arms on the other side of the pivot point, and wherein the energy converter activation device drives the energy converter as the linear actuator extends or retracts and the first mechanical arm moves relative to the second mechanical arm.

* * * * *